United States Patent [19]
Reising, Jr.

[11] 3,766,467
[45] Oct. 16, 1973

[54] INVERTER - OSCILLATOR
[75] Inventor: Flavian Reising, Jr., Fort Wayne, Ind.
[73] Assignee: General Electric Company, Indianapolis, Ind.
[22] Filed: Jan. 12, 1972
[21] Appl. No.: 217,161

[52] U.S. Cl...... 321/45 R, 315/DIG. 2, 315/DIG. 5, 331/113 A
[51] Int. Cl. ............................................ H02m 7/52
[58] Field of Search............... 315/221, 223, DIG. 2, 315/DIG. 5; 321/45; 331/113 A

[56] References Cited
UNITED STATES PATENTS
| | | | |
|---|---|---|---|
| 3,351,839 | 11/1967 | Johnson et al. | 321/45 R |
| 3,629,725 | 12/1971 | Chun | 331/113 A |
| 2,964,676 | 12/1960 | Davies et al. | 315/DIG. 2 |
| 3,020,491 | 2/1962 | Kurtz | 321/45 S |
| 3,334,291 | 8/1967 | Hehenkamp | 321/45 S |
| 3,396,307 | 8/1968 | Campbell | 315/221 |

Primary Examiner—William M. Shoop, Jr.
Attorney—John M. Stoudt et al.

[57] ABSTRACT
An inverter - oscillator for providing AC electric energy to a load, such as a gas tube discharge device, from a source of DC electric energy. The inverter - oscillator circuit arrangement includes a saturable core transformer having a primary winding a secondary winding, and additional windings. The emitter of each of a pair of power transistors is connected to the primary winding on opposite sides of a primary winding center tap. The base of each of the transistors is connected to its emitter through an additional winding. A conduction control capacitor is connected between the base and the additional winding and is shunted by a rectifier poled to limit the charge on the capacitor of a polarity tending to turn on the corresponding transistor. A tuning capacitor is connected across the primary winding. The collector of each of the transistors is connected to a regulated source of DC electric energy and the base of each transistor is connected to the source through a resistance. The secondary winding of the transformer is connected to a load, such as a gas tube discharge device, through a linear inductance. The gas tube discharge device may also be connected through a second transformer to a source of AC electric energy for providing power to the filament heaters of the tube.

6 Claims, 1 Drawing Figure

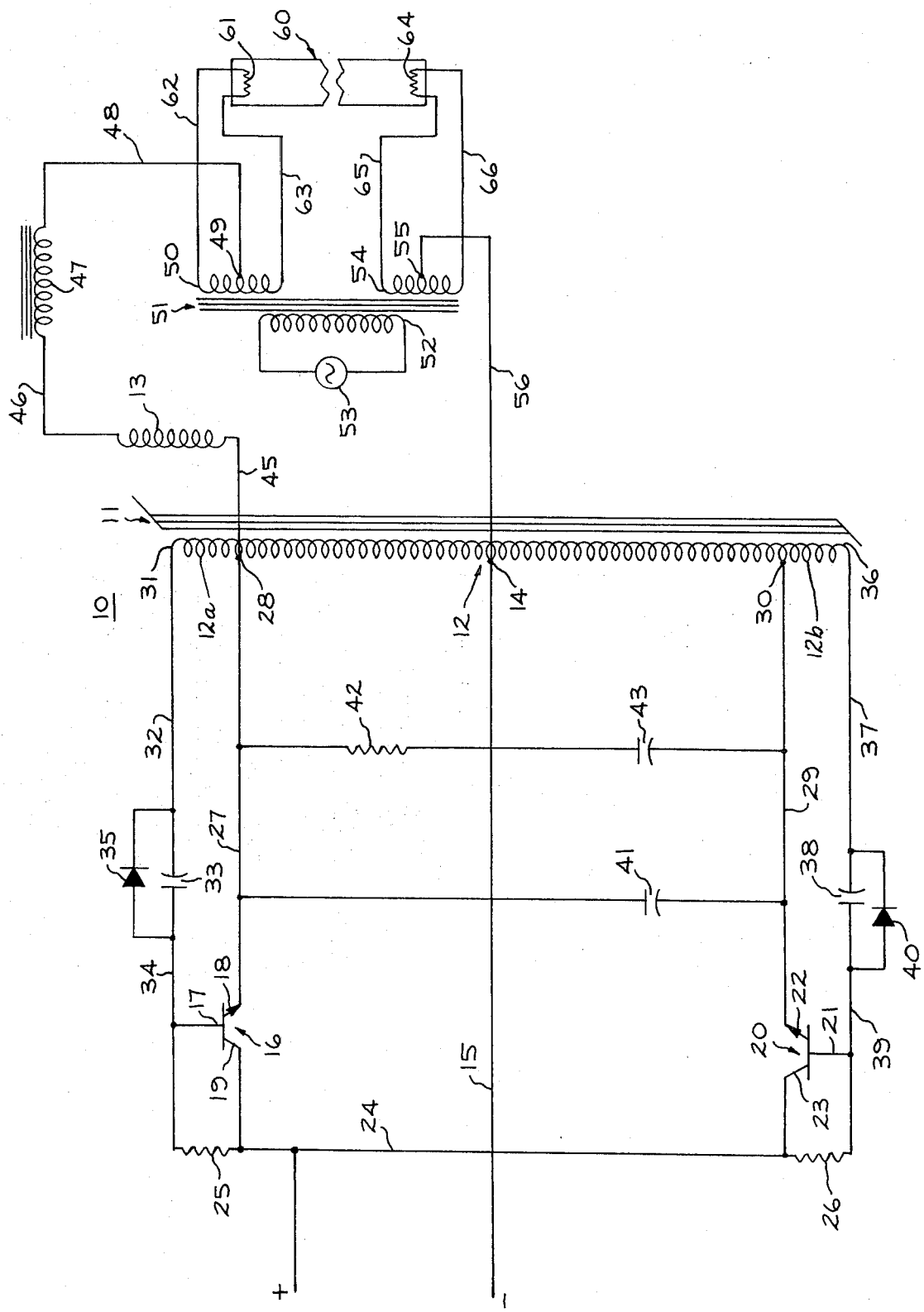

3,766,467

INVERTER - OSCILLATOR

BACKGROUND OF THE INVENTION

In the reprographic art often it is desirable to operate a gas tube discharge device such as a fluorescent lamp at rather high frequency in order to provide a suitable light for obtaining good reproductions. It is well known that fluorescent tubes have wide variations in their characteristics between their off condition and their fully activated or stabilized operating condition. For instance, the resistance between the terminals of such a lamp is extremely high, practically an open circuit, when the lamp is not conducting. However, this resistance falls to a much lower value when the lamp has stabilized in operation. The instantaneous value of this resistance changes dramatically as the lamp turns on and heats up to its stable operating condition. In the reprographic art often the lamp is turned on with a signal which may conveniently be a square wave and then is operated as part of a tuned circuit having a sine wave signal impressed upon it. Also the sine wave signal may be at a different frequency than the square wave signal. In the past it has been very difficult to provide a simple compact power supply or circuit arrangement for providing both the starting signal and the operating signal. This problem is compounded by the large changes in the characteristics, particularly the resistance, of the lamp as it is activated.

SUMMARY OF THE INVENTION

It is therefore an object of the present invention to provide a new and improved inverter - oscillator circuit arrangement for providing AC electric energy to a load from a source of DC electric energy.

It is another object of the present invention to provide such an improved inverter - oscillator which will function essentially as a push-pull inverter until the load is activated and as an oscillator with a tuned tank circuit after activation of the load.

It is still another object of the present invention to provide such an inverter - oscillator which performs well in spite of wide variations in operating characteristics of the load as the load is activated.

It is yet another object of the present invention to provide such an improved inverter - oscillator, using a pair of power transistors, in which inadvertent turn on of either transistor is prevented.

The present invention, in one embodiment thereof, provides an improved inverter - oscillator circuit arrangement for providing AC electric energy to a load from a source of DC electric energy, including a saturable core transformer having a center tapped primary winding, a secondary winding, and at least two additional windings magnetically closely coupled to the primary winding. The circuit arrangement also includes a pair of power transistors. The emitters of the transistors are connected to the primary winding on opposite sides of the center tap. Each of the collectors is connected to a source of DC electric energy. Conductance means connects the base of each of the transistors to the corresponding emitter through a corresponding additional winding. Each of the conductance means includes means preventing inadvertent turn on of the associated transistor. Output means connects the secondary winding of the transformer to a load. A tuning capacitance is connected between the emitters and forms, with the output means and the load, a tuned tank circuit when the load is activated. The circuit arrangement will act as a push-pull inverter until the load is activated and thereafter will act as an oscillator with a tuned tank circuit.

The above-mentioned and other features and objects of this invention, as well and the manner of obtaining them, will become more apparent, and the invention itself will be more fully understood by reference to the following description, taken in conjunction with the accompanying drawing, wherein:

Brief Description of the Drawing

The single FIGURE of the drawing is a schematic circuit diagram of a inverter - oscillator circuit arrangement incorporating one embodiment of the present invention.

Description and Preferred Embodiment

Referring now to the drawing there is illustrated, in schematic circuit diagram form, an inverter - oscillator circuit arrangement 10 for providing AC electric energy from a source of DC electric energy to a load. For purposes of illustration a load is illustrated as a gas tube discharge device such as, for instance, a fluorescent lamp. The inverter - oscillator circuit arrangement 10 includes a saturable core autotransformer 11 having a primary winding 12, a first additional winding 12a, a second additional winding 12b and a secondary winding 13. The primary winding is center tapped, that is the center or midpoint 14 of the primary winding 12 is connected by a conductor 15 to the ground or negative side of a DC power supply (indicated by the minus sign). The inverter - oscillator also includes a first power transistor 16, having a base electrode 17, an emitter electrode 18 and a collector electrode 19; and a second power transistor 20, having a base electrode 21, an emitter electrode 22 and a collector electrode 23.

The collector electrode 19, 23 are connected by a conductor 24 to the positive side of the DC power supply (indicated by the plus sign). The base 17 is connected to the conductor 24, and thus to the power supply, through a resistance 25 while the base 21 is connected to conductor 24, and thus the power supply, by a similar resistance 26.

The emitter electrode 18 is connected by conductor 27 to a one end point 28 of the primary winding 12 while the emitter electrode 22 is connected by conductor 29 to the other end point 30 of the primary winding 12 on the opposite side of center tap 14. One end of first additional winding 12a is connected to end point 28 of the primary winding while its other end 31 is connected by conductor 32 to one side of a conduction control capacitor 33. The other side of capacitor 33 is connected by conductor 34 to be base electrode 17 of transistor 16. A rectifier 35 is connected in parallel or shunt with the capacitor 33 and is poled so as to conduct current from base electrode 17 to additional winding 12a. This limits build up of a charge on capacitor 33 of a polarity which would tend to turn on transistor 16. One end of second additional winding 12b is connected to end point 30 of the primary winding while its other end 36 is connected by conductor 37 to one side of another conduction control capacitor 38. The other side of capacitor 38 is connected by conductor 39 to base electrode 21 of power transistor 20. A rectifier 40 is connected in parallel or shunt with capacitor 38 and is poled to conduct current from base electrode 21 to additional winding 12b. This limits the build up of a charge on capacitor 38 of a polarity tending to turn on power transistor 20. A tuning capacitance 41 is connected across primary winding 12. Additionally a series connection of resistance 42 and capacitance 43 is connected across primary winding 12.

Primary winding 12 and additional windings 12a and 12b may be formed from a continuous winding of electric conductor with the primary winding end points 28, 30 being provided by suitable taps, as is shown in the illustration embodiment. However, the additional windings may be formed separately from the primary winding so long as they are placed in the transformer in such a manner that the additional windings are magnetically closely coupled to the primary winding.

One end of the transformer secondary winding 13 is connected to the primary 12 in autotransformer relationship, as indicated by conductor 45, while the other end is connected by a conductor 46 to one end of a linear inductance 47. The other end of the linear inductance is connected by conductor 48 to the center point 49 of one secondary winding 50 of a second transformer 51. The transformer 51 includes a primary 52 connected to a suitable source of 60 hz electric energy, schematically indicated at 53. The transformer 51 also includes a additional secondary winding 54, connected by conductor 56 to the center tap 14 of primary winding 12.

For purposes of illustration a load has been indicated in the form of a gas tube discharge device such as a fluorescent lamp generally indicated at 60. The fluorescent lamp 60 may be of the continuously heated type in which the filament theater 61, at one end of the lamp, is connected by a conductor 62 to one end of the transformer secondary 50 and by conductor 63 to the other end of the transformer secondary 50. Similarly, a filament heater 64 at the other end of the fluorescent lamp is connected by conductor 65 to one end of the secondary winding 54 and by conductor 66 to the other end of the secondary winding 54.

The 60 hz power provided by the transformer 51 effectively heats the filament heaters 61 and 64. At the same time the much higher frequency operating current for the fluorescent lamp may flow through conductor 48, secondary 50, conductors 62, 63, the lamp 60, conductors 65, 66, secondary 54 and conductor 56.

When the fluorescent lamp 60 is off or inactivated its resistance is extremely high and thus the secondary circuit of transformer 11 appears as if there is an open circuit condition between conductor 48 and conductor 56. On the other hand, when the fluorescent lamp 60 is activated the resistance within the fluorescent lamp, which appears in the circuit of the secondary coil 13 of the transformer 11, is much smaller and the secondary circuit is effectively completed. Capacitance 41 is reflected into this secondary circuit so that the secondary circuit, including linear inductance 47, the resistance of the fluorescent lamp 60 and the reflected value of capacitance 41, forms an RLC circuit. This RLC circuit is a tuned tank circuit when the resistance of fluorescent lamp 60 has stabilized in its hot, activated condition.

Assume that the fluorescent lamp is inactivated or off and that voltage is applied from the DC source to begin operation of the exemplification circuit arrangement. A slight unbalance in conductivity normally exists between any two transistors and thus normally a slight umbalance of conductivity will exist between power transistor 16 and power transistor 20. Assuming that transistor 16 is slightly more conductive than transistor 20, current will begin to flow from the DC source through the collector 19 and emitter 18 of transistor 16 to end point 28 of the primary winding 12, and then from the center tap 14 of the primary winding back to the DC power supply. Such a flow causes end point 28 to become positive with respect to center tap or center point 14. The mutual inductance of primary winding 12 and additional windings 12a, 12b will cause point 31 to be positive with respect to point 28 and point 30 to be positive with respect to point 36. The current flow also causes a voltage to be induced in the secondary winding 13; however, no current will flow through the secondary circuit as the fluorescent lamp 60 is effectively an open circuit.

Since additional winding end 31 is positive with respect to primary winding end point 28 it will tend to bias power transistor 16 to become more conductive or turn on. This action is cumulative in effect and the transformer 11 saturates. Upon saturation of the transformer, sufficient current cannot be provided to maintain the rate of change of flux, which provides the voltage for the base drive of transistor 16, and transistor 16 becomes less conductive. This reduces the voltage applied to the transformer, causing the relative polarity of the various points of the transformer primary and additional windings to reverse. That is, point 36 becomes positive with respect point 30, which becomes positive with respect center point 14, which becomes positive with respect to point 28, which becomes positive with respect to point 31. Power transistor 16 becomes reversed biased, that is the potential of base 17 is less positive than the emitter 18, and power transistor 16 is turned off. The base 21 of transistor 20 becomes more positive than the emitter 22 and transistor 20 is turned on to provide current from the DC source through conductor 24, the collector emitter path of power transistor 20, conductor 29 to end point 30 of primary winding 12, and then from center point 14 of the primary winding through conductor 15 back to the DC source. This action causes the transformer 11 to saturate in the opposite polarity. Again, upon saturation of the transformer, insufficient current is provided and the magnetic field collapses. This once again reverses the polarity of the primary and additional windings. This operation continues so long as the lamp 60 is in its inactivated state. This mode of operation is that of a well known push-pull transistor inverter which tends to produce a square wave voltage having a frequency governed by the parameters of the circuit. For instance in an inverter - oscillator for reprographic applications the circuit may be designed to provide a square wave with an eight kilohertz frequency.

The open circuit wave-form generated by the exemplification circuit arrangement will not be a true square wave. The tuning capacitance 41 is connected across primary winding 12 in order to provide a tuned tank circuit during times when the load is activated. However, this capacitance is in the circuit even when the load is inactivated and has some effect. As the transformer 11 oscillates it not only draws current from the emitters of each of the power transistor 16 and 20, it also causes a charge to be build up on capacitance 41 and then discharged through the primary winding 12.

This additional current source causes the square wave to be slightly rounded off at the corners and causes the reversal of polarity of the primary and additional windings to be somewhat less than instantaneous. The series connection of resistance 42 and capacitance 43 has no substantial effect on the manner of operation of the circuit arrangement, merely being provided to limit the collector to emitter voltage on the transistors 16 and 20.

Assuming now that the fluorescent lamp 60 is fully activated and has reached a stable operating condition, a secondary circuit is completed from secondary winding 13 through conductor 46, and linear inductance 47, conductor 48, secondary 50 of transformer 51, conductors 62 and 63 to the fluorescent lamp 60, the circuit then extends from the other end of the fluorescent lamp 60 through the conductors 65, 66 to the other secondary winding 54 of transformer 51 and then through conductor 56 back to the center tap 14.

As explained above the secondary circuit (including the reflected value of capacitance 41) provides a tuned tank circuit so that the overall circuit arrangement will act as a oscillator. More particularly it acts as a class C oscillator in which the transformer 11 automatically oscillates at a frequency determined by the interrelationship of the various components of the circuit. For reprographic applications it may be designed to operate at a frequency of twenty-five kilohertz. The power transistors 16 and 20 each conduct only a portion of the appropriate half cyles. More particularly, each conducts only the portions of half cycles necessary to replensih any energy consumed as losses in the circuit. Power transistor 16 will be turned on to conduct only when the point 31 becomes sufficiently positive with respect to point 28 to turn on the transistor and then will be turned off when this positive interrelationship ceases to exist. The amount of charge and the polarity of the charge on capacitor 33 interacts with the potential difference between points 31 and 28 so as to provide control of the conduction of transistor 16. The conduction control capacitor 38 functions in a similar manner with regard to power transistor 20. Additionally the capacitors 33, 38 perform a self-biasing function for the circuit arrangement. The capacitors essentially will never have the same charge and therefore, when the circuit is inactivated and then reactivated, one will tend to cause its associated power transistor to turn on more than the other. This assists the normal inherent lack of symmetry between the transistors themselves to assure that operation of the circuit will begin.

It will be understood from the foregoing that the exemplification circuit arrangement is called upon to act as a push-pull inverter providing an essentially square wave output for activating the lamp and thereafter to act as a oscillator, more particularly a class C osscillator, operating into a tuned tank circuit upon complete activation of the lamp. When the lamp is first activated the resistance of the lamp is not the same as when it is in a stablized operating condition. Thus when the lamp first comes on, the secondary circuit really is not the tuned circuit for which the circuit arrangement is designed. As the lamp begins to operate there may not be sufficient power to cause the circuit to operate as a class C oscillator. It then will ring down and revert back to the square wave invertor mode of operation until the lamp again begins to operate, at which time it will again attempt to change over to the class C oscillator mode of operation.

According to the present invention, the circuit arrangement provides a good supply of energy for moving through this change of mode of operation and, at the same time, prevents inadvertent turn on of either of the transistors 16, 20. Assume that the circuit is operating as an inverter with an essentially square wave output and that power transistor 20 is conducting. The point 36 is positive with respect to point 30. This causes a charge to be built up on capacitance 38 with the terminal of capacitance 38 connected to conductor 37 being positive with respect to the terminal of capacitance 38 connected to conductor 39. When the magnetic field collapses and the transformer 11 reverses polarity this charge may bleed off from capacitor 38 through conductor 37, additional winding 12b, primary winding 12 and conductor 15 back to the DC source, and then from the DC source through conductor 24 and resistance 26 to the other side of the capacitance 38.

Depending on the length of time transistor 16 remains conductive and on the time constant provided by the various circuit components, the charge on capacitor 38 can be essentially completely bled off. In fact, capacitance 38 could start charging in the other direction, that is, the terminal connected to conductor 39 could become positive with respect to the terminal connected to conductor 37. If this occurred and any appreciable charge built up, it then would cause power transistor 20 to turn on. If power transistor 16 is still conducting when transistor 20 is turned on, the collector 23, emitter 22 path of the power transistor 20 effectively would be connected across twice the supply voltage and the current surge through the transistor would undoubtedly cause it to fail. The rectifier 40 precludes this from happening. As the rectifier 40 is poled to conduct current from the conductor 39 to conductor 37, it effectively limits the charge on capacitor 38 from ever reaching a point sufficient to turn on power transistor 20 without point 36 first becoming positive with respect to point 30 and this occurs only when transistor 16 turns off.

At the same time, this arrangement allows the charge previously built up on capacitor 38 when point 36 was positive with respect to point 30 to be substantially bleed off. This is important during the changeover from square wave output inverter operation to class C oscillator operation. Assume the fluorescent lamp 60 begins to conduct when power transistor 16 is on. Then, when the transformer 11 reverses polarity it is desirable that there be good, relatively long conduction of power transistor 20 since the secondary will not be tuned and this power is needed for driving the circuit into class C oscillation. If the previously developed charge on capacitor 38 (that is with the terminal connected to conductor 37 being positive with respect with to the terminal connected to conductor 39) has not been substantially dissipated, power transistor 20 will come on fully only after point 36 becomes sufficiently positive with respect to point 30 to overcome the charge on capacitor 38 in addition to the required turn on voltage of the transistor 20. This would substantially delay full turn on of the power transistor 20 and could cause the circuit to ring down rather than go into a class C oscillator mode of operation. The capacitance 33 and rectifier 35 perform in essentially the same manner on opposite half cycles.

By the present arrangement so long as the circuit arrangement is operating essentially as a square wave output inverter the charge previously built up on each of the conduction control capacitors 33, 38 is allowed to essentially bleed off while its associated transistor is turned off without any danger of inadvertently turning that transistor on while the other transistor is conducting. This is true even though the presence of the tuning capacitor 41 causes the voltage reversal of the square wave mode to be something less than instantaneous.

Once the circuit has switched over to the class C oscillator mode the capacitors 33 and 38 function normally to provide control of the turn on of their associated power transistors so that the transistors are turned on an amount of time which is sufficient to replenish the energy dissipated by losses in the circuit.

A new and improved inverter - oscillator circuit for operating a fluorescent lamp in a reprographic application was constructed using components as listed below:

| | | |
|---|---|---|
| Resistor 25 | 4K ohms | Transistor 16 DTS410 (Delco) |
| Resistor 26 | 4K ohms | Transistor 20 DTS 410 (Delco) |
| Capacitor 33 | 0.47 µfd | Rectifier 35IN5059 |
| Capacitor 38 | 0.47 µfd | Rectifier 40 IN5059 |
| Capacitor 41 | 0.1 µfd | |
| Capacitor 43 | 470 pfd | |
| Resistor 42 | 100 ohm | |
| Inductor 47 | 400 µh | |

While in accordance with the patent statutes there has been described what at present is considered to be the preferred embodiments of this invention, it will be obvious to those skilled in the art that various changes and modifications may be made therein without departing from the invention. For instance transformer 11 need not be of the autotransfromer type; i.e., the secondary may be separated from the primary winding. Also, with appropriate obvious changes in the transformer connections the transistors may be reversed. That is, each of the collectors may be connected to the transformer primary winding and each of the emitters may be connected to the source of DC electric energy. It is the applicant's invention in the following claims to cover all such equivalent variations as fall within the true spirit and scope of the invention.

What I claim as new and desire to secure by Letters Patent in the United States is:

1. A push-pull inverter circuit including a pair of transistors connected to the primary of a saturable core transformer; means to connect a load to the secondary of said transformer; means enabling said circuit to function as an oscillator with a tuned tank, including the load, upon activation of load; and means connected to the base of each of said transistors providing current conduction in one direction and current blocking in the opposite direction for preventing inadvertent turn-on of either one of said pair of transistors while the other of said pair of transistors is conducting.

2. A circuit arrangement for providing AC electric energy to a load from a source of DC electric energy, including:
   a. a saturable core transformer having a primary winding, a secondary winding, and first and second additional windings magnetically closely coupled to said primary winding,
   b. said primary winding having a center tap for connection to one side of the source of DC electric energy;
   c. a pair of power transistors, each of said transistors having an emitter, a collector and a base;
   d. said collector and emitter of each of said transistors being connected between the other side of the source of DC electric energy and said primary winding, the connection of each of said transistors to said primary winding being on the opposite side of the center tap than the corresponding connection of the other of said transistors;
   e. first means connecting said base of one of said transistors to its emitter through said first additional winding, second means connecting said base of the other of said transistors to its emitter through said second additional winding, each of said first and second means providing current conduction in one direction and current blocking in the opposite direction for preventing in-advertent turn-on of either one of said pair of transistors inadvertant the other one of said pair of transistors is conducting;
   f. output means for connecting said secondary winding to a load;
   g. capacitance means connected across said primary winding for forming, with said output means and the load, a tuned tank circuit when the load is activated;
   h. whereby said circuit arrangement will act as a push-pull inverter until the load is activated and thereafter will act as an oscillator with a tuned tank circuit.

3. A circuit arrangement as set forth in claim 2 wherein each of said emitters is connected to said primary winding.

4. A circuit arrangement as set forth in claim 2 wherein each of said first and second means includes a conduction control capacitance and a rectifier connected in parallel therewith and poled to limit the level of charge on said conduction control capacitance of a polarity tending to turn on the associated transistor.

5. A circuit arrangement as set forth in claim 2 wherein said output means includes a linear inductance.

6. A circuit arrangement for providing AC electric energy to a gas tube discharge device having a substantial change in operating characteristic as it is activated, from a source of DC electric energy, said circuit arrangement including:
   a. a saturable core autotransformer having a primary winding, a secondary winding, and first and second additional windings magnetically closely coupled to said primary winding;
   b. said primary winding having a center tap for connection to one side of the source of DC electric energy;
   c. a pair of power transistors, each of said transistors having an emitter, a collector and a base;
   d. each of said emitters being connected to said primary winding on the opposite side of said center tap from the other of said emitters;
   e. each of said collectors being connected to the other side of source of DC electric energy from said center tap;
   f. each of said bases being connected through a resistance to the other side the source of DC electric energy from said center tap;
   g. said base of one of said transistors being connected to the corresponding emitter through said first additional winding and a first conduction control capacitance and poled to limit the level of charge on said first conduction control capacitance of a polarity tending to turn-on the associated transistor while the other of said pair of transistors is conducting;

h. said base of the other of said transistors being connected to the corresponding emitter through said second additional winding and a second conduction control capacitance; a second rectifier connected in parallel with said second conduction control capacitance and poled to limit the level of charge on said second control conduction capacitance of a polarity tending to turn on the associated transistor while the other of said pair of transistors is conducting; a tuning capacitance connected across said primary winding;

output circuit means for connecting a gas tube discharge device to said secondary winding in series with a linear inductance, said tuning capacitance being reflected into said output circuit means for providing a tuned series resistance - inductance - capacitance circuit upon activation of the gas tube discharge device.

* * * * *

UNITED STATES PATENT OFFICE
CERTIFICATE OF CORRECTION

Patent No. 3,766,467　　　　　　　　Dated October 16, 1973

Inventor(s) Flavian Reising Jr.

It is certified that error appears in the above-identified patent and that said Letters Patent are hereby corrected as shown below:

Column 8, line 16, delete "inadvertant" and insert -- while --.

Signed and sealed this 26th day of March 1974.

(SEAL)
Attest:

EDWARD M. FLETCHER, JR.　　　　　　C. MARSHALL DANN
Attesting Officer　　　　　　　　　　Commissioner of Patents